United States Patent
Miller

(10) Patent No.: US 10,444,018 B2
(45) Date of Patent: Oct. 15, 2019

(54) COMPUTER-IMPLEMENTED METHOD TO TEST THE SENSITIVITY OF A SENSOR FOR DETECTING MOVEMENT OF A TRACKING DEVICE WITHIN AN ESTABLISHED FRAME OF REFERENCE OF A MOVING PLATFORM

(71) Applicant: MICROSOFT TECHNOLOGY LICENSING, LLC, Redmond, WA (US)

(72) Inventor: Quentin S. Miller, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 556 days.

(21) Appl. No.: 14/634,579

(22) Filed: Feb. 27, 2015

(65) Prior Publication Data

US 2016/0252352 A1    Sep. 1, 2016

(51) Int. Cl.
| | |
|---|---|
| *G01C 21/16* | (2006.01) |
| *G06F 1/16* | (2006.01) |
| *G06F 3/01* | (2006.01) |
| *G06F 3/0346* | (2013.01) |

(52) U.S. Cl.
CPC .............. *G01C 21/16* (2013.01); *G06F 1/163* (2013.01); *G06F 3/012* (2013.01); *G06F 3/017* (2013.01); *G06F 3/0346* (2013.01)

(58) Field of Classification Search
CPC ..... G01C 21/16; A61B 5/6803; A61B 5/6887; G06F 3/0346; G06F 3/017; G06F 1/163; G06F 3/012
See application file for complete search history.

(56) References Cited

U.S. PATENT DOCUMENTS

| | | | |
|---|---|---|---|
| 5,645,077 A | 7/1997 | Foxlin | |
| 6,050,822 A | 4/2000 | Faughn | |
| 6,176,837 B1 | 1/2001 | Foxlin | |
| 6,474,159 B1 | 11/2002 | Foxlin et al. | |
| 6,633,267 B2 | 10/2003 | Numa | |
| 6,757,068 B2 | 6/2004 | Foxlin | |
| 7,312,766 B1 | 12/2007 | Edwards | |
| 7,640,106 B1 | 12/2009 | Stokar et al. | |

(Continued)

OTHER PUBLICATIONS

International Preliminary Report on Patentability Issued in PCT Application No. PCT/US2016/017045, dated Apr. 11, 2017, 12 Pages.

(Continued)

*Primary Examiner* — Michael Jung
(74) *Attorney, Agent, or Firm* — Newport IP, LLC; Scott Y. Shigeta

(57) ABSTRACT

Technologies are described herein for providing the discoverability and utilization of one or more reference sensors. Configurations disclosed herein utilize a first inertial sensor mounted to a device to determine a frame of reference, and a second inertial sensor mounted to an object to determine movement of the object within the frame of reference. Configurations disclosed herein determine if the frame of reference is established. If it is determined that the frame of reference is established, the first inertial sensor and the second inertial sensor are used to detect movement of the object within the frame of reference.

20 Claims, 7 Drawing Sheets

(56) References Cited

U.S. PATENT DOCUMENTS

| | | | |
|---|---|---|---|
| 7,672,781 | B2 | 3/2010 | Churchill et al. |
| 7,717,841 | B2 | 5/2010 | Brendley et al. |
| 8,209,140 | B2 | 6/2012 | Bailey |
| 8,704,882 | B2 | 4/2014 | Turner |
| 8,767,306 | B1 | 7/2014 | Miao et al. |
| 2002/0194914 | A1 | 12/2002 | Foxlin et al. |
| 2004/0149036 | A1 | 8/2004 | Foxlin et al. |
| 2006/0284792 | A1 | 12/2006 | Foxlin |
| 2007/0132714 | A1 | 6/2007 | Nilsson |
| 2008/0234935 | A1* | 9/2008 | Wolf ............... G01C 21/16 701/472 |
| 2008/0314145 | A1 | 12/2008 | Sato |
| 2009/0189974 | A1 | 7/2009 | Deering |
| 2010/0216509 | A1 | 8/2010 | Riemer et al. |
| 2010/0321277 | A1 | 12/2010 | Spruck et al. |
| 2011/0260921 | A1* | 10/2011 | Harrat ............... G01C 21/16 342/386 |
| 2012/0323515 | A1* | 12/2012 | Liu ............... G06F 15/00 702/94 |
| 2013/0124006 | A1* | 5/2013 | Anantha ............... G06Q 50/01 701/1 |
| 2013/0132246 | A1 | 5/2013 | Amin |
| 2013/0246301 | A1 | 9/2013 | Radhakrishnan |
| 2013/0265440 | A1 | 10/2013 | Mizuta |
| 2013/0336629 | A1 | 12/2013 | Mulholland et al. |
| 2014/0085183 | A1 | 3/2014 | Na |
| 2014/0098008 | A1 | 4/2014 | Hatton |
| 2014/0129135 | A1 | 5/2014 | Holden |
| 2014/0129951 | A1 | 5/2014 | Amin |
| 2014/0139486 | A1 | 5/2014 | Mistry et al. |
| 2014/0364212 | A1 | 12/2014 | Osman et al. |
| 2015/0009187 | A1 | 1/2015 | Mercea et al. |
| 2015/0099461 | A1 | 4/2015 | Holden |
| 2015/0143297 | A1 | 5/2015 | Wheeler |
| 2015/0161564 | A1 | 6/2015 | Sweeney |
| 2015/0271290 | A1 | 9/2015 | Tao |
| 2016/0187974 | A1 | 6/2016 | Mallinson |
| 2017/0038213 | A1* | 2/2017 | Han ............... G01C 21/16 |
| 2017/0059886 | A1* | 3/2017 | Fayolle ............... G02C 7/025 |

OTHER PUBLICATIONS

U.S. Appl. No. 14/634,476—Non Final Office Action, dated Jul. 14, 2017, 42 pages.

Uber Expansion: 2015 Uber Data & Stats (2015), pp. 1-4. Retrieved from https://uberexpansion.com/2015-uber-data-stats/.

Uber Driver Data Report—Business Insider, Jan. 22, 2015, pp. 1-3. Retrieved from http://www.businessinsider.com/uber-driver-data-report-2015-1.

PCT Search Report and Written Opinion dated Apr. 28, 2016 for PCT Application No. PCT/US16/17045, 13 pages.

"International Search Report and Written Opinion Issued in PCT Application No. PCT/US2016/017046", dated May 3, 2016, 13 Pages.

Almazan, et al., "Full Auto-Calibration of a Smartphone on Board a Vehicle using IMU and GPS Embedded Sensors", In IEEE Intelligent Vehicles Symposium, Jun. 23, 2013, pp. 1374-1380.

"Auto-alignment Platform", Published on: May 29, 2009, Available at; http://www.rpaelectronics.com/Visual-Simulation/auto-alignment-platform.html, 1 page.

Foxlin, et al., "FlightTracker: A Novel Optical/Inertial Tracker for Cockpit Enhanced Vision", In IEEE/ACM International Symposium on Mixed and Augmented Reality, Nov. 2, 2004, 10 pages.

Foxlin, et al., "Improved Registration for Vehicular AR Using Auto-Harmonization", In IEEE International Symposium on Mixed and Augmented Reality, Sep. 10, 2014, pp. 105-112.

"Inertial Measurement Unit (IMU)", Published on: Feb. 1, 2003, Available at: http://www.ssl.umd.edu/projects/RangerNBV/thesis/2-4-1.htm, 3 pages.

"Position Sensors", Published on: Jan. 7, 2012, Available at: http://developer.android.com/guide/topics/sensors/sensors_position.html, 6 pages.

"Wireless IMU", Retrieved on: Nov. 13, 2014, Available at: https://play.google.com/store/apps/details?id=org.zwiener.wimu&hl=en, 2 pages.

"Second Written Opinion Issued in PCT Application No. PCT/US2016/017046", dated Jan. 26, 2017, 11 Pages.

"Second Written Opinion Issued in PCT Application No. PCT/US2016/017045", dated Jan. 16, 2017, 11 Pages.

U.S. Appl. No. 14/634,476—Final Office Action, dated Jan. 26, 2018, 18 pages.

"Office Action Issued in European Patent Application No. 16708515.8", dated Dec. 21, 2018, 7 Pages.

* cited by examiner

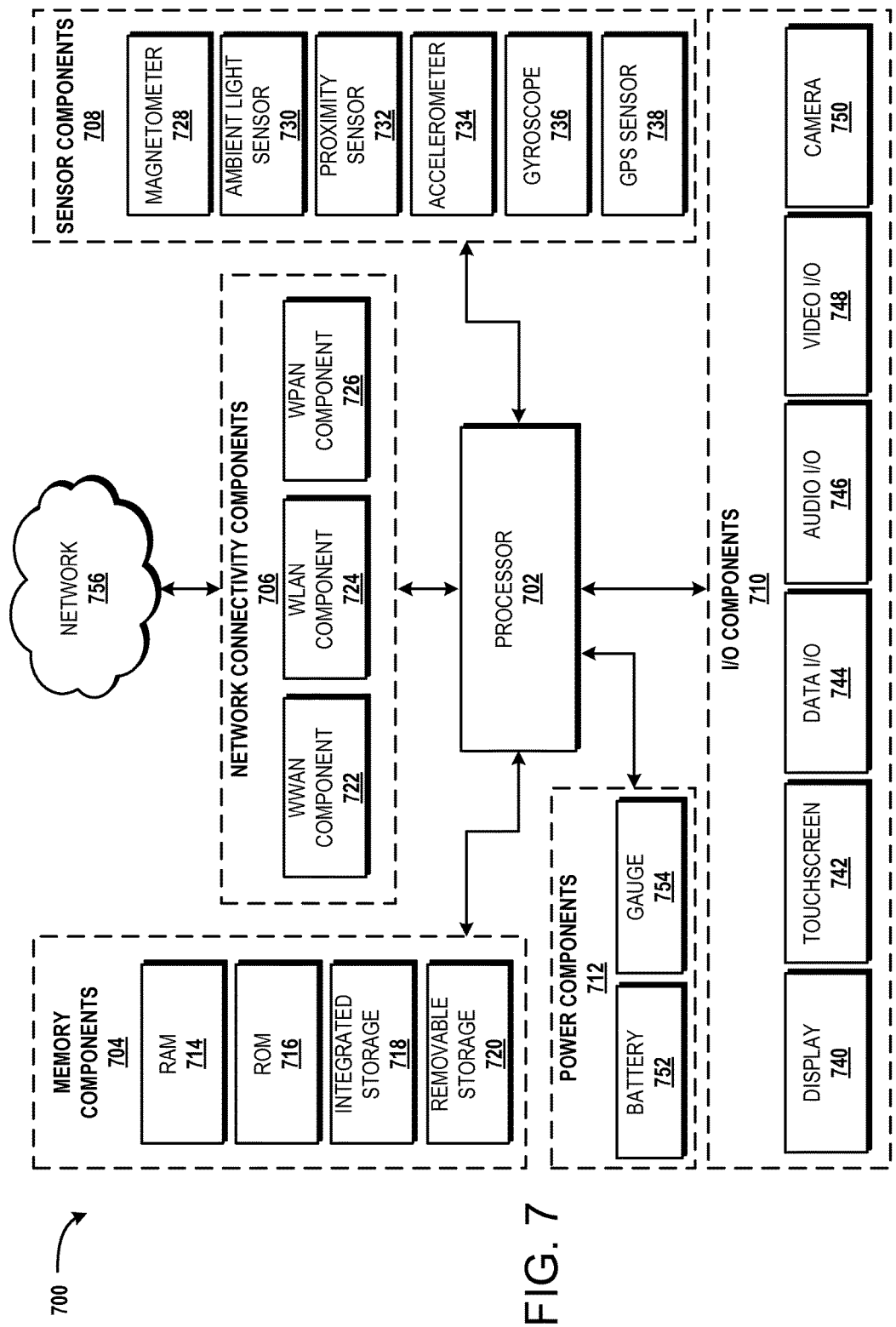

US 10,444,018 B2

COMPUTER-IMPLEMENTED METHOD TO TEST THE SENSITIVITY OF A SENSOR FOR DETECTING MOVEMENT OF A TRACKING DEVICE WITHIN AN ESTABLISHED FRAME OF REFERENCE OF A MOVING PLATFORM

BACKGROUND

Inertial sensors are used in a wide range of applications for tracking the movement of objects, such as limbs, cameras, input devices, or head mounted displays (HMDs). In some examples, inertial tracking devices have been successfully applied to a wide range of applications including virtual environment (VE) training, virtual prototyping, interactive visualization and design, virtual reality (VR) gaming, and vehicle simulation. Despite the level of accuracy provided by some inertial sensors, some existing technologies cannot be used in certain applications. For example, when an inertial sensor is used to track the movement of an object in a moving vehicle, the signal produced by the inertial sensor cannot be relied upon because the inertial sensor cannot determine if inertial forces are caused by the vehicle or the object.

To overcome some of the shortcomings of existing technologies, some devices configured with an inertial sensor are enhanced with visual tracking sensors. For example, in addition to using an inertial sensor, some devices have one or more cameras to track the movement of an object. However, solutions using visual tracking sensors are not as efficient as solutions using inertial sensors when it comes to computing resources and power consumption.

It is with respect to these and other considerations that the disclosure made herein is presented.

SUMMARY

Technologies are described herein for providing the discoverability and utilization of one or more reference sensors. In one mode of operation, configurations disclosed herein utilize a tracking sensor mounted to an object to detect, monitor and/or analyze the movement of the object. Configurations disclosed herein also detect the presence of one or more reference sensors mounted to a vehicle. If the one or more reference sensors are discovered, the one or more reference sensors are utilized to determine a frame of reference, and the tracking sensor mounted to the object is utilized to detect, monitor and/or analyze the movement of the object within the frame of reference.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is a computer architecture diagram illustrating a computing device architecture for a computing device capable of implementing aspects of the techniques and technologies presented herein.

DETAILED DESCRIPTION

Figure 1:
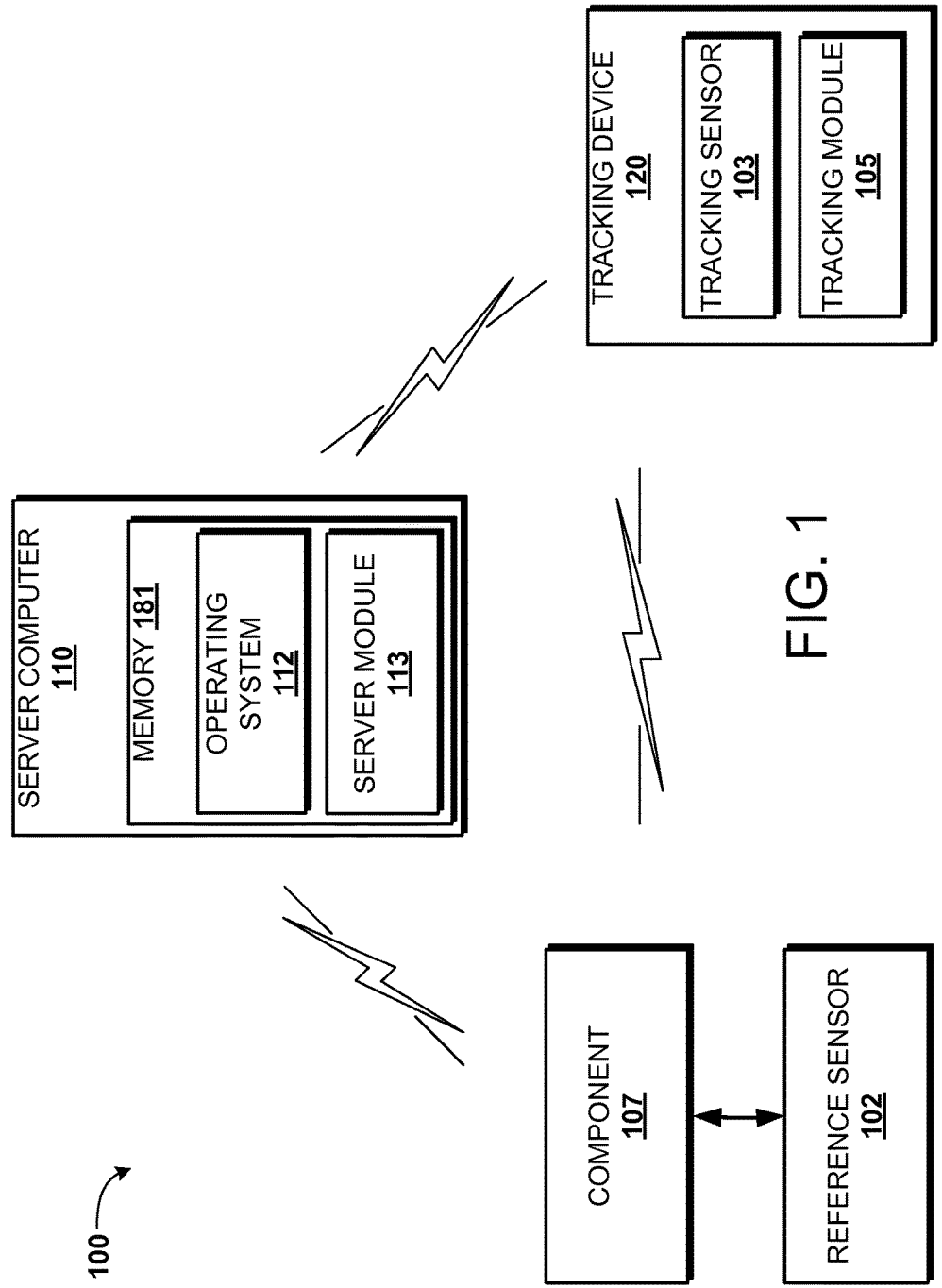
FIG. 1 is a block diagram showing several example components of a system for providing the discoverability and utilization of one or more reference sensors.

Technologies are described herein for providing the discoverability and utilization of one or more reference sensors. In one mode of operation, configurations disclosed herein utilize a tracking sensor mounted to an object to detect, monitor and/or analyze the movement of the object. Configurations disclosed herein also detect the presence of one or more reference sensors mounted to a vehicle. If the one or more reference sensors are discoverable, e.g., present and/or in condition to be utilized, the one or more reference sensors are utilized to determine a frame of reference, and the tracking sensor mounted to the object is utilized to detect, monitor and/or analyze the movement of the object within the frame of reference.

In some configurations, one mode of operation allows for the utilization of a tracking sensor mounted to an object to detect, monitor and/or analyze the movement of the object. Configurations disclosed herein also detect the presence of a reference sensor, which may be mounted to a vehicle. If the reference sensor is found to be present, a tracking device in communication with the tracking sensor and/or other devices receive information related to the reference sensor and/or information related to the vehicle. The received information may include capabilities of the reference sensor, information related to a communication protocol, location or position information of the reference sensor and/or other contextual information. Information related to the vehicle may also be communicated to the tracking device and/or another device of the system.

In some configurations, the received information may be used to determine if the reference sensor is usable. For instance, if the received information indicates that the reference sensor has a particular status, e.g., under repair or malfunctioning, or otherwise incompatible with the tracking sensor, the system may determine that the reference sensor is not usable. In such a scenario, the system may stay in a mode where it only uses the tracking sensor mounted to an object to detect, monitor and/or analyze the movement of the object. However, if the received information indicates that the reference sensor is usable, e.g., meets one or more parameters, and/or performance thresholds, the reference sensor is utilized to determine a frame of reference, and the tracking sensor mounted to the object is utilized to detect, monitor and/or analyze the movement of the object within the frame of reference.

In some configurations, the received information may be used determine if the reference sensor is compatible with the sensor mounted to the tracking device. As will be described in more detail below, one or more factors derived from information, such as a hardware specification, may be used to determine the compatibility of the reference sensor. If it is determined that the reference sensor is compatible with the sensor mounted to the tracking device, the reference sensor is utilized to determine a frame of reference, and the tracking sensor mounted to the object is utilized to detect, monitor and/or analyze the movement of the object within the frame of reference.

By use of the techniques and technologies described herein, a reference sensor mounted to a moving platform, which may be a vehicle or any other moving object, may be discovered and utilized by a tracking device, such as a HMD. By providing techniques for discovering the presence of reference sensors, a user may transport a tracking device from one vehicle to another with little or no user interaction to coordinate the sensors of the tracking device with reference sensors of each vehicle.

While the subject matter described herein is primarily presented in the general context of techniques for providing the discoverability and utilization of one or more reference sensors, it can be appreciated that the techniques described herein may apply to any type of sensor and/or any type of device or devices embodying the sensors. As will be described in more detail herein, it can be appreciated that implementations of the techniques and technologies described herein may include the use of solid state circuits, digital logic circuits, computer component, and/or software executing on one or more devices. Signals described herein may include analog and/or digital signals for communicating a changed state, movement and/or any data associated with motion detection.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for providing the discoverability and utilization of one or more reference sensors. As will be described in more detail below with respect to FIGS. 5-7, there are a number of applications and services that can embody the functionality and techniques described herein.

FIG. 1 is a system diagram showing aspects of one illustrative mechanism disclosed herein for providing the discoverability and utilization of one or more reference sensors. As shown in FIG. 1, the system 100 includes a tracking sensor 103 mounted to a tracking device 120 and a reference sensor 102 that is in communication with a component 107. In some configurations, the reference sensor 102 may be mounted to a moving platform, such as a vehicle, for purposes of determining a frame of reference that moves with the moving platform.

In one mode of operation, configurations disclosed herein utilize the tracking sensor 103 mounted to an object, such as the user's head, to detect, monitor and/or analyze the movement of the object. As will be described in more detail and shown in FIG. 2 and FIG. 3, the tracking device 120 may be in the form of a HMD or any other device used to track the movement of an object.

Configurations disclosed herein also detect the presence of the reference sensor 102, which may be mounted to a vehicle. If at least one reference sensor 102 is found to be present, the reference sensor 102 is utilized to determine a frame of reference, and the tracking sensor 103 mounted to the object is utilized to detect, monitor and/or analyze the movement of the object within the frame of reference.

In some configurations, the of the presence reference sensor 102 may be detected by the use of a device or collection of devices configured to detect the presence of other devices and/or components. One or more factors may be used to detect the presence of other devices, such as the strength of a signal, a distance measured between two or more devices, a location of the tracking sensor relative to a vehicle and/or other items. For instance, BLUETOOTH and/or WiFi technologies built into the tracking device 120 may be used to discover the component 107 that is configured to operate and/or communicate with the reference sensor 102. Although this example utilizes specific protocols, any known technology for discovering the presence of one or more hardware components may be used with the system 100 disclosed herein. For instance, the presence of the reference sensor 102 may be detected by the use of a wired connection, which may be manually connected by a user.

When the tracking device 120 detects the presence of the reference sensor 102, the tracking device 120 may receive information related to the reference sensor 102, the component 107 and/or information related to a vehicle or other object attached to the reference sensor 102. The received information may include capabilities of the reference sensor 102, specifications of a communication protocol, location or position information of the reference sensor 102 and/or other contextual information. For example, if a vehicle has one or more reference sensors 102 mounted to the vehicle, the received information may identify the capabilities, tolerances and/or position of each reference sensor 102. Such information may be used by the tracking device 120 to determine if the reference sensor 102 is compatible and/or usable with the tracking sensor 103.

In other examples, the information received by the tracking device 120 can be combined with other information such as information related to the tracking sensor 103 and/or the data related to the tracking device 120. The tracking device 120 can also provide data from one or more inputs, which can be an input from a user interface and/or video and/or audio device. One or more inputs may provide context to one or more scenarios and/or conditions related to the tracking device 120.

The information generated or obtained by the component 107 and/or the tracking device 120 can be communicated to the server computer 110 for further processing. For instance, if the obtained or generated information requires interpretation, transformation, translation and/or any type of processing, the server computer 110 can be configured to process such information and return an output to any device. For example, if the obtained or generated information includes a voice recording, such information can be translated to data that can be used by the tracking device 120 to, among many operations, coordinate the tracking sensor 103 and the reference sensor 102 or determine if the reference sensor 102 is usable.

Based on the obtained or generated information and/or the output of the server computer 110, configurations disclosed herein may determine if the reference sensor 102 is compatible and/or usable with the tracking sensor 103 of the tracking device 120. If it is determined that the reference sensor 102 is compatible and/or usable with the tracking sensor 103, the reference sensor 102 is utilized to determine a frame of reference, and the tracking sensor 103 mounted to the object is utilized to detect, monitor and/or analyze the movement of the object within the frame of reference.

In some configurations, the tracking device 120 may be worn by a user in a manner such that the tracking sensor 103 is mounted to an object, such as a user's head. In such configurations, the tracking sensor 103 generates a signal indicating movement of the object. In addition, if the reference sensor 102 is mounted to a vehicle or any other movable platform carrying the user and the tracking device 120, the system 100 utilizes the signal generated by the reference sensor 102 to determine a frame of reference associated with the vehicle or the platform. The system 100 processes the signals from the tracking sensor 103 and the reference sensor 102 to track the movement of the object within the frame of reference. By the use of the techniques described herein, given that the reference sensor 102 is mounted to the vehicle, the system 100 can track, detect and/or monitor movement of the object relative to the vehicle.

While in operation, when a difference, e.g., some measured delta, between the signal of the tracking sensor 103 and the signal of the reference sensor 102 do not meet a threshold, the system 100 determines that the tracking device 120 is not moving within the frame of reference. In such a scenario, by use of the techniques presented herein, the system 100 may still determine that the tracking device 120 is not moving within the frame of reference even if the vehicle carrying the user and the tracking device 120 is accelerating, e.g., braking, turning, or increasing speed. However, when the difference between the signal of the tracking sensor 103 and the signal of the reference sensor 102 meet or exceed the threshold, the system 100 can determine that the tracking device 120 is moving within the frame of reference. Since the reference sensor 102 is attached to, and hence moving with, the vehicle, the system 100 can determine that the tracking device 120 is moving relative to the vehicle.

As summarized above, the techniques described herein enable the user to move from one vehicle to another with little or no user interaction to conform the tracking device 120 and/or other components of the system 100 to reference sensors mounted to a new vehicle or any other moving platform. The transportability and/or portability of the tracking device 120 is attributed, at least in part, to techniques that receive information regarding the compatibility and/or usability of one or more reference sensors mounted to one or move vehicles.

In some configurations, the tracking device 120, the component 107 and the server computer 110 may operate as stand-alone devices. In such configurations, element 107, the tracking device 120 and the server computer 110 may be configured individually to perform the techniques described herein. In other configurations, the portable device 102, the tracking device 120 and the server computer 110 may be configured to operate in concert to perform the techniques described herein. In addition, the component 107, the tracking device 120 and the server computer 110 may be interconnected through one or more communication mechanisms, which may include wired or wireless connections. In addition, the communication of the devices and computers of FIG. 1 may include the use of local and/or wide area networks or other forms of communication, which may involve BLUETOOTH, WiFi or other types of communication mechanisms.

The component 107 may be any type of computing device configured to communicate a signal generated by the reference sensor 102 to one or more devices, such as the tracking device 120 and/or the server computer 110. The component 107 may have one or more components such as those shown in FIG. 7, such as a GPS sensor, a processor, memory components and network connectivity components. In some configurations, the component 107 may be built into a vehicle or part of a portable component that can be affixed to the vehicle.

In some configurations, the component 107 may include a display interface for displaying data. The component 107 may also include an input device for receiving input from the user. The display interface may be a touch-sensitive display screen that is operable to display images and/or video data, and also operable to receive input from the user, input that may involve a touch signal that indicates an input gesture.

The tracking device 120 may be any type of device. In some examples, the tracking device 120 may be a wearable device such as a watch, HMD or any other device used to track and/or monitor the movement of an object. The tracking device 120 may be configured with solid state components and/or computer components that implement the techniques described herein. The tracking device 120 may optionally include a display interface for displaying data and/or an input device for receiving input from the user. The display interface may be a touch-sensitive display screen that is operable to display images and/or video data, and also operable to receive input from the user, input that may involve a touch signal or a video signal captured by a camera that indicates an input gesture. For instance, a camera mounted to an HMD may capture a user's hand movements as an input. One or more sensors, such as the tracking sensor 103, maybe used to generate data indicating a user input gesture.

The reference sensor 102 and the tracking sensor 103, which are also referred to herein generically and universally as "sensors," can include an individual device or a combination of devices for measuring the velocity and/or position. For example, the sensors may include an accelerometer capable of measuring acceleration in one, two, or three orthogonal axes. The sensors can include Micro-Electro-Mechanical Sensors (MEMS) or other configurations capable of measuring acceleration in one or more axes. An output signal of the sensor can be digital or analog and include a range of values indicative of movement, sensitivity and/or other values related to acceleration.

The server computer 110 may be any type of computing device, such as a personal computer, a server or a number of computing devices configured to perform aspects of the techniques described herein. The server computer 110 may include memory 181 for storing an operating system 112 and a server module 113 that is configured to aspects of the techniques and technologies disclosed herein. As will be described below, the server computer 110 may include other components for implementing aspects of the techniques and technologies disclosed herein. For instance, contextual data used by the system 100 may be interpreted from user activity or activity of other services and platforms.

Figure 2:
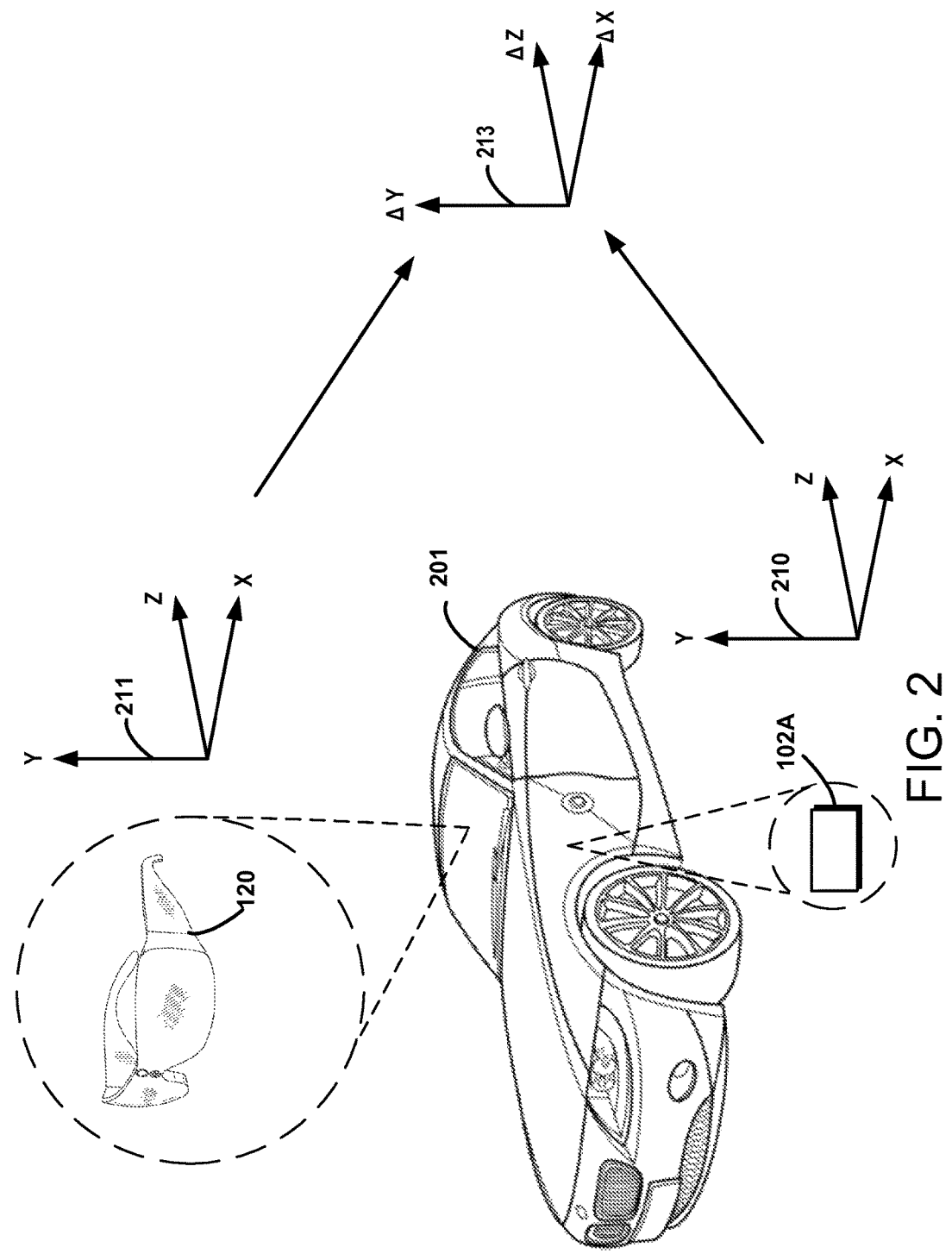
FIG. 2 illustrates representations of a tracking device and a reference sensor positioned in a car.
Figure 3:
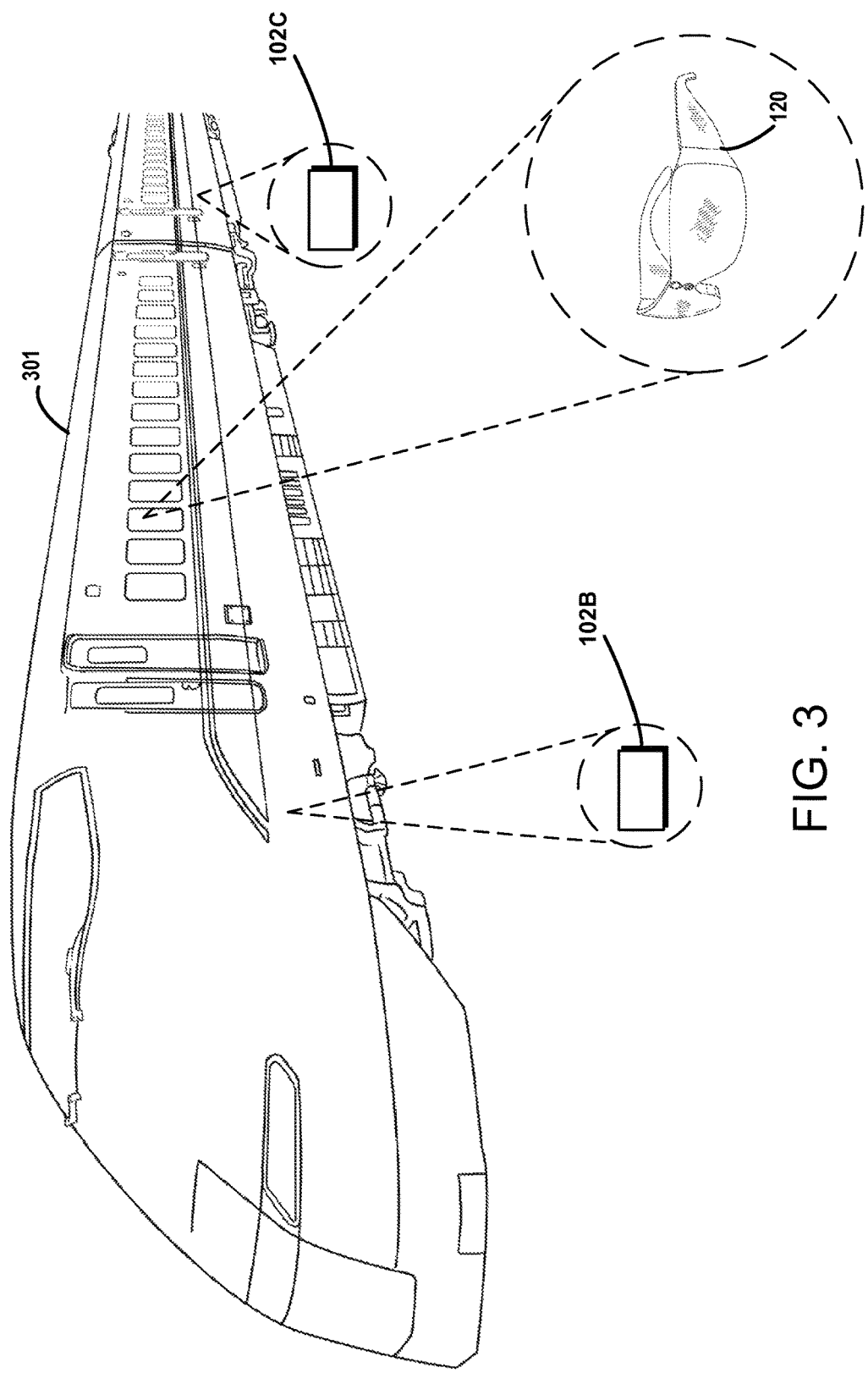
FIG. 3 illustrates representations of a tracking device and a reference sensor positioned in a train.

Turning now to FIGS. 2-3, an illustrative example shows how a configuration of the system 100 may be utilized. In this example, to show aspects of the system's portability and utility, it is given that a user is wearing a tracking device 120, such as an HMD. As described above, the tracking device 120 has a tracking sensor 103 to detect, monitor and/or analyze the movement of the object. In this example, the techniques described herein allow the user to operate the system 100 in multiple vehicles with little or no user interaction to coordinate the tracking device 120 with and one or more reference sensors 102 mounted to the vehicles.

FIG. 2 illustrates a representation of a first reference sensor 102A positioned in a car 201. In the current example, it is a given that the first reference sensor 102A is mounted to the car 201 such that the motion of the first reference sensor 102A follows the motion of the car 201. The first reference sensor 102A or another device, such as the component 107, is configured to transmit one or more signals to be discovered by the tracking device 120, which in this example is in the form of a HMD. In this example, when a user wearing the HMD enters the car 201, using techniques disclosed herein, the HMD detects the presence of the first reference sensor 102A.

Using techniques described herein, when the tracking device 120 comes within range of communication of the first reference sensor 102A, the tracking device 120 determines if the first reference sensor 102A is compatible and/or usable with the tracking sensor (103 of FIG. 1) of the tracking device 120. Once it is determined that the first reference sensor 102A is compatible and/or usable with the tracking sensor 103, the system 100 utilizes the tracking sensor of the tracking device 120 and first reference sensor 102A to detect, monitor and/or analyze the movement of the tracking device 120 relative to the car 201.

One or more factors, which may be derived from information such as hardware specifications, a profile, tolerances and/or other data may be used to determine if the first reference sensor 102A is compatible and/or usable with the tracking sensor 103. For instance, configurations may determine that the first reference sensor 102A is usable if the sensitivity of the first reference sensor 102A is within a threshold value of the sensitivity of the tracking sensor 103. Other contextual information or other types of information received from one or more resources, such as the server computer 110, may be used to determine compatibility and/or usability of a reference sensor. For example, a service or remote computing device may provide information related to one or more sensors and/or other related hardware. Such information, which may be stored by a database, may be communicated to the tracking device 120 and/or server computer 110 and used to determine compatibility and/or usability. Other contextual information regarding the status of device, status of a user, activity of a user and/or other information may be used to determine compatibility and/or usability.

As shown in FIG. 2, when the first reference sensor 102A and the tracking sensor 103 are utilized, the system 100 analyzes and processes the relative difference between the signal generated by the first reference sensor 102A and the signal generated by the tracking sensor 103 to determine the movement of the tracking device 120 relative to the first reference sensor 102A. As shown in FIG. 2, the movement of the first reference sensor 102A is represented by the first vector model 210, and the movement of the tracking device 120 is represented by the second vector model 211. The movement of the tracking device 120 relative to the first reference sensor 102A is represented by the third vector model 213.

Any technique or combination of techniques for processing two or more signals to identify a measured delta between the sensor signals may be used to implement the techniques described herein. The resulting output, which is modeled by the third vector model 213, may be used by the system 100 to determine the movement of the tracking device 120, e.g., the HMD, relative to the car 201, regardless of the acceleration that is generated by the car 201.

In the current example, by use of the techniques described herein, when the user exits the car 201 and moves the HMD away from the component 107 and/or the first reference sensor 102A, the system 100 detects that the first reference sensor 102A is no longer present. When the first reference sensor 102A is no longer present, the system 100 may enter a mode of operation where the system 100 only uses the tracking sensor 103 of the tracking device 120 to monitor movement of the HMD.

The system 100 may utilize one or more factors to determine that the first reference sensor 102A is no longer present and/or useable. For example, the system 100 may receive an input from a device and/or a user, determine that the communication with the component 107 is out of range and/or use other proximity sensors to determine that first reference sensor 102A is no longer present. The factors to determine that the first reference sensor 102A is no longer present and/or useable may include a location of one or more devices, a distance between two or more devices and/or other scenarios created by a vehicle or device. Contextual data and/or other types of data from any resource or remote computer may be used to determine that the first reference sensor 102A is no longer present and/or usable.

Next, in FIG. 3, in continuing the current example, the user may move from the car 201 to a train 301. Using one or more techniques described herein, the HMD, may detect the presence of a second reference sensor 102B. Once the presence of the second reference sensor 102B has been detected the system 100 can utilize the second reference sensor 102B to determine a frame of reference and utilize the tracking sensor 103 of the HMD to track the movement of the HMD within the frame of reference in a manner as described herein.

In addition to having a second reference sensor 102B, a vehicle such as the train 301 shown in FIG. 3, may have many more sensors, such as a third reference sensor 102C positioned in another car of the train 301. Having more than one sensor on one vehicle, such as the train 301, allows for an increased level of accuracy versus only having one reference sensor. In the example of FIG. 3, as the user moves from car to car wearing the tracking device 120, e.g., the HMD, different reference sensors (102B or 102C) may be used depending on a proximity to each reference sensor (102B or 102C). In this illustrative example, it can be appreciated that each car of a train may be subjected to different forces at one time, thus different reference sensors can help increase the accuracy of a system tracking the motion of the HMD relative to the train 301.

By the use of the techniques described herein, the system 100 can track, detect and/or monitor movement of an object relative to a vehicle. In addition, the techniques described herein may allow a user to transport components of the system 100 from one vehicle to another with little or no user interaction to conform the system 100 to a new vehicle or any moving platform.

Figure 4:
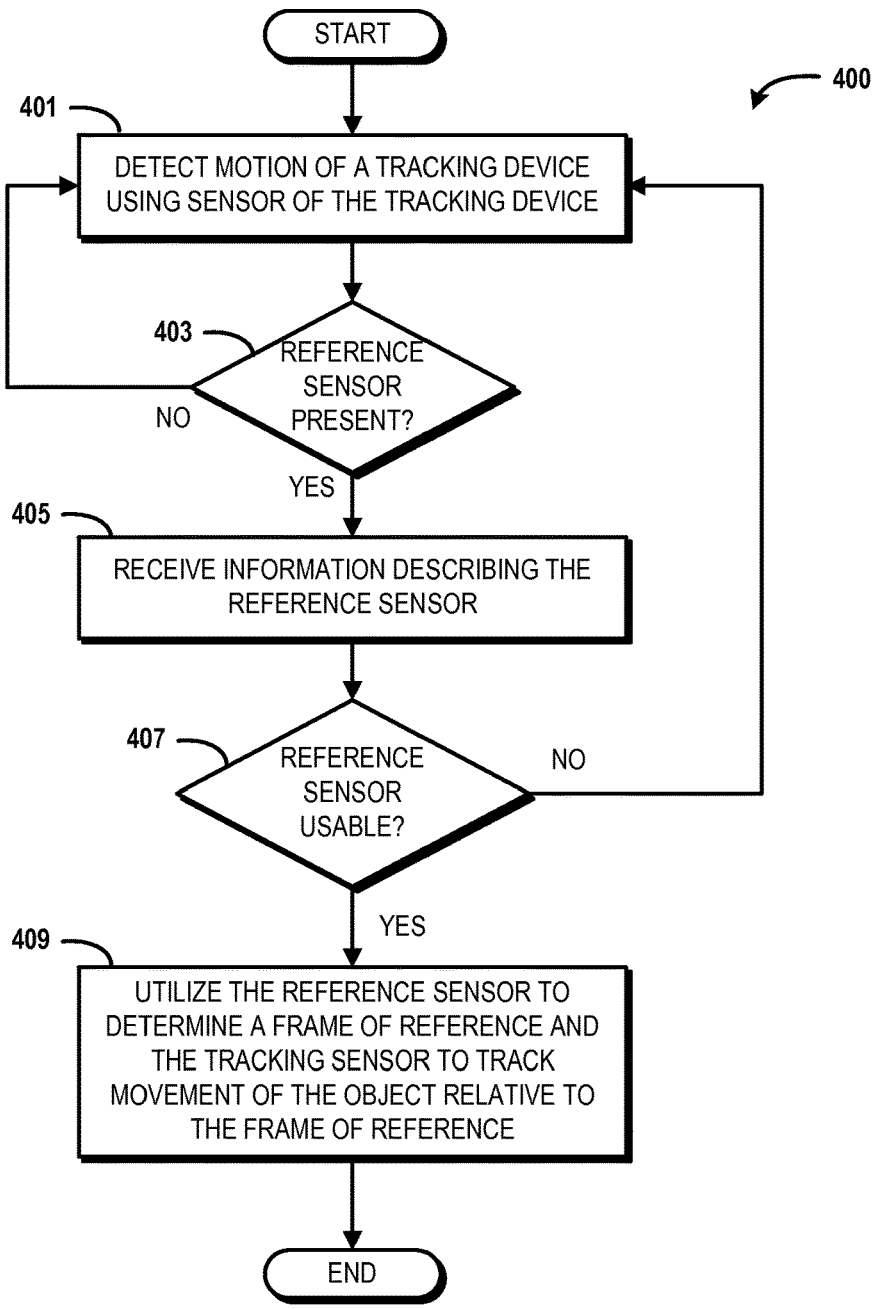
FIG. 4 is a flow diagram showing aspects of a routine disclosed herein for providing the discoverability and utilization of one or more reference sensors.

Turning now to FIG. 4, aspects of a routine 400 for providing the discoverability and utilization of one or more reference sensors are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIGS. 5-7, the operations of the routine 400 are described herein as being implemented, at least in part, by an application and/or circuit, such as the tracking module 105. Although the following illustration refers to the tracking module 105, it can be appreciated that the operations of the routine 400 may be also implemented in many other ways. For example, the routine 400 may be implemented, at least in part, by the server module 113. In addition, one or more of the operations of the routine 400 may alternatively or additionally be implemented, at least in part, by the tracking module 105 of the tracking device 120 working alone or in conjunction with other software modules, such as the one or more application servers 608 of FIG. 6. Any service, circuit or application suitable for providing contextual data indicating the position or state of any device may be used in operations described herein.

With reference to FIG. 4, the routine 400 begins at operation 401, where the tracking module 105 detects the movement of the tracking device 120 by the use of the tracking sensor 103 mounted to the tracking device 120. As summarized above, one mode of operation allows for the utilization of a tracking sensor mounted to an object to detect, monitor and/or analyze the movement of the object. This mode can be used when, for instance, a reference sensor 102 is not present. As shown in FIG. 4, the routine 400 loops through operations 401 and 403 and continues to use the tracking sensor 103 of the tracking device 120 until the system 100 detects the presence of a reference sensor 102.

When the presence of a reference sensor 102 is detected, the routine 400 proceeds to operation 405 where the tracking module 105 receives information related to the reference sensor. In some configurations, the received information may include capabilities of the reference sensor, information related to a communication protocol, location or position information of the reference sensor and/or other contextual information. In operation 405, information related to the vehicle may also be communicated to the tracking device 120 and/or another device of the system 100.

Next, at operation 407, the tracking module 105 determines if the reference sensor 102 is usable with the tracking sensor 103 mounted to the tracking device 120. One or more factors, which may be derived from information such as hardware specifications, a profile, tolerances and/or other data may be used to determine if a reference sensor 102 is usable and/or compatible with the tracking sensor 103. For instance, configurations may determine that a reference sensor 102 is usable if the sensitivity of the reference sensor 102 is within a threshold value of the sensitivity of the tracking sensor 103. Other contextual information or other types of information received from one or more resources, such as the server computer 110 may be used in operation 407. For example, a service of an application server may include information related to one or more sensors and/or other related hardware. Such information, which may be stored by a database, may be communicated to the tracking device 120 or server computer 110 for the processing of operation 407. Other contextual information regarding the status of device, status of a user, activity of a user may be used in operation 407.

At operation 407, if it is determined that the reference sensor 102 is not compatible and/or usable with the tracking sensor 103, the routine 400 returns to operation 401 where the tracking module 105 remains in the operating mode using the tracking sensor 103 of the tracking device 120. As shown in FIG. 4, the routine 400 can loop between operations 401 and 407 if it is the reference sensor 102 is not compatible and/or usable with the tracking sensor 103.

However, at operation 407, if it is determined that the reference sensor 102 is compatible and/or usable with the tracking sensor 103, the routine 400 proceeds to operation 409 where the tracking module 105 utilizes the reference sensor 102 to determine a frame of reference, and the tracking sensor 103 mounted to the object is utilized to detect, monitor and/or analyze the movement of the object within the frame of reference.

By use of the techniques and technologies described herein, a reference sensor 102 mounted to a moving platform, such as a vehicle, may be discovered and utilized by a tracking device 120, such as a HMD. By providing techniques for discovering the presence of reference sensors 102, a user may transport a tracking device 120 from one vehicle to another with little or no user interaction to coordinate the sensors of the tracking device with reference sensors of each vehicle they enter. In some configurations, the routine 400 may terminate following the execution of operation 409.

In other configurations, following operation 409, the routine 400 may return to operation 403 where the tracking module 105 determines if reference sensor 102 is still present. In this configuration, for example, when the user leaves the vehicle, the system 100 may return to the mode where the reference sensor 102 is no longer used, and the tracking module 105 may only use the sensor of the tracking device 120 to track the movement of the object.

In some configurations, the system 100 may provide an indication that the reference sensor is in use. For example, when it is determined that the reference sensor is compatible with a tracking sensor 103 or when the presence of at least one reference sensor is discovered, the tracking device 120 may generate a notification and/or activate another device. In some configurations, the tracking device 120 may also provide a control allowing the user to accept or deny the use of the reference sensor 102. For instance, when the tracking device 120 issues a notification that the reference sensor is in use, the user may provide an input indicating that they accept the use of the reference sensor 102. In response to receiving an input indicative of the acceptance, the reference sensor is used to determine a frame of reference, and the tracking device 120 is used to track the movement of an object relative to the frame of reference. If the user denies the use of the reference sensor, the tracking device 120 is used to track the movement of an object.

The indication generated by the system 100 may be any signal, sound, light and/or a mechanical actuation. For example, an element of a user interface may appear and/or a sound may be generated to alert a user. In other configurations, the tracking device 120 may initiate another form of communication or notice, e.g., a device may vibrate and/or cause a signal to activate another device.

Figure 5:
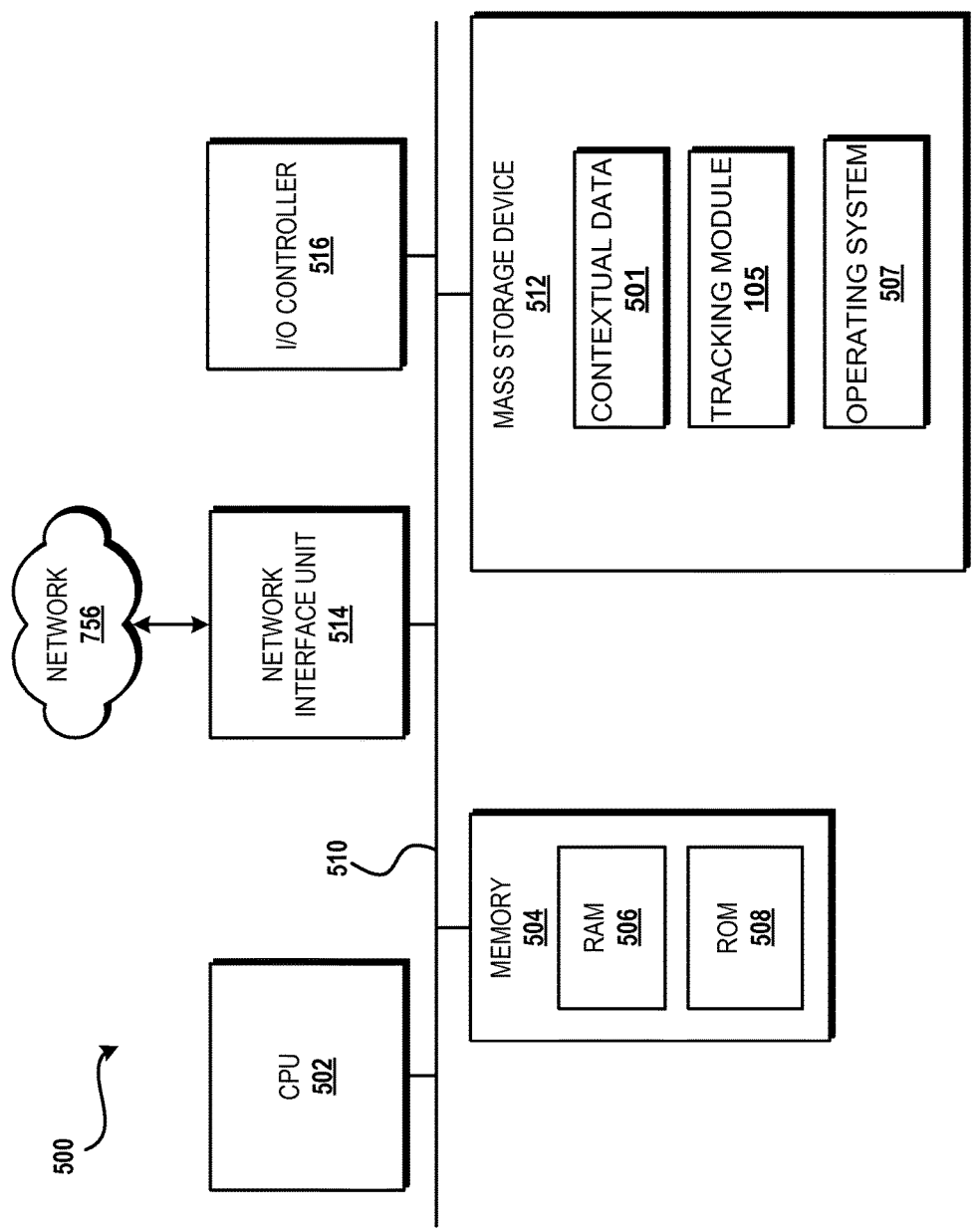
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as the computing device 101 (FIG. 1), capable of executing the program components described above for providing the discoverability and utilization of one or more reference sensors. Thus, the computer architecture 500 illustrated in FIG. 5 illustrates an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 507, and one or more application programs including, but not limited to, the web browser 510, tracking module 105, and a web browser application 510, which may be used to view content data 117.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 756 and/or another network (not shown). The computer architecture 500 may connect to the network 756 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Figure 6:
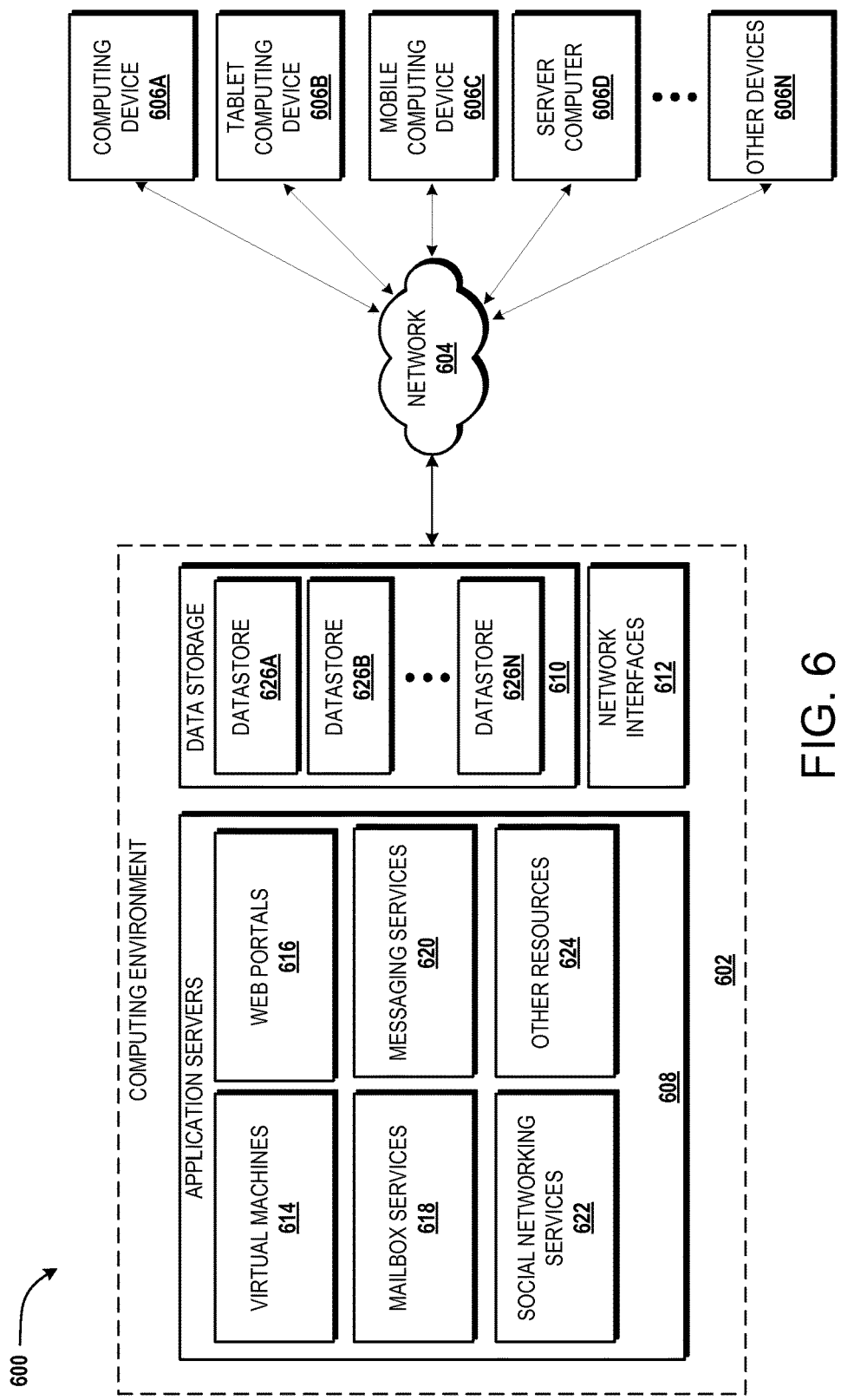
FIG. 6 is a diagram illustrating a distributed computing environment capable of implementing aspects of the techniques and technologies presented herein.

FIG. 6 depicts an illustrative distributed computing environment 600 capable of executing the software components described herein for providing the discoverability and utilization of one or more reference sensors, among other aspects. Thus, the distributed computing environment 600 illustrated in FIG. 6 can be utilized to execute any aspects of the software components presented herein. For example, the distributed computing environment 600 can be utilized to execute aspects of the web browser 510, the content manager 105 and/or other software components described herein.

According to various implementations, the distributed computing environment 600 includes a computing environment 602 operating on, in communication with, or as part of the network 604. The network 604 may be or may include the network 756, described above with reference to FIG. 5. The network 604 also can include various access networks. One or more client devices 606A-606N (hereinafter referred to collectively and/or generically as "clients 606") can communicate with the computing environment 602 via the network 604 and/or other connections (not illustrated in FIG. 6). In one illustrated configuration, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602. Two example computing architectures for the clients 606 are illustrated and described herein with reference to FIGS. 5 and 7. It should be understood that the illustrated clients 606 and computing architectures illustrated and described herein are illustrative, and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for providing the discoverability and utilization of one or more reference sensors. It should be understood that this configuration is illustrative, and should not be construed as being limiting in any way. The application servers 608 also host or provide access to one or more portals, link pages, Web sites, and/or other information ("Web portals") 616.

According to various implementations, the application servers 608 also include one or more mailbox services 618 and one or more messaging services 620. The mailbox services 618 can include electronic mail ("email") services. The mailbox services 618 also can include various personal information management ("PIM") services including, but not limited to, calendar services, contact management services, collaboration services, and/or other services. The messaging services 620 can include, but are not limited to, instant messaging services, chat services, forum services, and/or other communication services.

The application servers 608 also may include one or more social networking services 622. The social networking services 622 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 622 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 622 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 622 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 622 are not mentioned herein for the sake of brevity. As such, the above configurations are illustrative, and should not be construed as being limited in any way. According to various implementations, the social networking services 622 may host one or more applications and/or software modules for providing the functionality described herein for providing the discoverability and utilization of one or more reference sensors. For instance, any one of the application servers 608 may communicate or facilitate the functionality and features described herein. For instance, a social networking application, mail client, messaging client or a browser running on a phone or any other client 606 may communicate with a networking service 622 and facilitate the functionality, even in part, described above with respect to FIG. 4.

As shown in FIG. 6, the application servers 608 also can host other services, applications, portals, and/or other resources ("other resources") 624. The other resources 624 can include, but are not limited to, document sharing, rendering or any other functionality. It thus can be appreciated that the computing environment 602 can provide integration of the concepts and technologies disclosed herein provided herein with various mailbox, messaging, social networking, and/or other services or resources.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more server computers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the application servers 608 and/or other data. Although not illustrated in FIG. 6, the datastores 626 also can host or store web page documents, word documents, presentation documents, data structures, algorithms for execution by a recommendation engine, and/or other data utilized by any application program or another module, such as the content manager 105. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including, but not limited to, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the clients 606. It should be understood that the clients 606 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 600 to utilize the functionality described herein for providing the discoverability and utilization of one or more reference sensors, among other aspects. In one specific example, as summarized above, techniques described herein may be implemented, at least in part, by the web browser application 510 of FIG. 5, which works in conjunction with the application servers 608 of FIG. 6.

Turning now to FIG. 7, an illustrative computing device architecture 700 for a computing device that is capable of executing various software components described herein for providing the discoverability and utilization of one or more reference sensors. The computing device architecture 700 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 700 is applicable to any of the clients 606 shown in FIG. 6. Moreover, aspects of the computing device architecture 700 may be applicable to traditional desktop computers, portable computers (e.g., laptops, notebooks, ultra-portables, and netbooks), server computers, and other computer systems, such as described herein with reference to FIG. 5. For example, the single touch and multi-touch aspects disclosed herein below may be applied to desktop computers that utilize a touchscreen or some other touch-enabled device, such as a touch-enabled track pad or touch-enabled mouse.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individuals components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, a touch-enabled input.

In some configurations, the processor 702 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, Calif. and others. In some configurations, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 604 of FIG. 6. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or adapted to provide voice and/or data communications in accordance with future generation technologies.

In some configurations, the WWAN component 722 is configured to provide dual-multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The magnetometer 728 is configured to measure the strength and direction of a magnetic field. In some configurations the magnetometer 728 provides measurements to a compass application program stored within one of the memory components 704 in order to provide a user with accurate directions in a frame of reference including the cardinal directions, north, south, east, and west. Similar measurements may be provided to a navigation application program that includes a compass component. Other uses of measurements obtained by the magnetometer 728 are contemplated.

The ambient light sensor 730 is configured to measure ambient light. In some configurations, the ambient light sensor 730 provides measurements to an application program stored within one the memory components 704 in order to automatically adjust the brightness of a display (described below) to compensate for low-light and high-light environments. Other uses of measurements obtained by the ambient light sensor 730 are contemplated.

The proximity sensor 732 is configured to detect the presence of an object or thing in proximity to the computing device without direct contact. In some configurations, the proximity sensor 732 detects the presence of a user's body (e.g., the user's face) and provides this information to an application program stored within one of the memory components 704 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 732 are contemplated.

The accelerometer 734 is configured to measure proper acceleration. In some configurations, output from the accelerometer 734 is used by an application program as an input mechanism to control some functionality of the application program. For example, the application program may be a video game in which a character, a portion thereof, or an object is moved or otherwise manipulated in response to input received via the accelerometer 734. In some configurations, output from the accelerometer 734 is provided to an application program for use in switching between landscape and portrait modes, calculating coordinate acceleration, or detecting a fall. Other uses of the accelerometer 734 are contemplated.

The gyroscope 736 is configured to measure and maintain orientation. In some configurations, output from the gyroscope 736 is used by an application program as an input mechanism to control some functionality of the application program. For example, the gyroscope 736 can be used for accurate recognition of movement within a 3D environment of a video game application or some other application. In some configurations, an application program utilizes output from the gyroscope 736 and the accelerometer 734 to enhance control of some functionality of the application program. Other uses of the gyroscope 736 are contemplated.

The GPS sensor 738 is configured to receive signals from GPS satellites for use in calculating a location. The location calculated by the GPS sensor 738 may be used by any application program that requires or benefits from location information. For example, the location calculated by the GPS sensor 738 may be used with a navigation application program to provide directions from the location to a destination or directions from the destination to the location. Moreover, the GPS sensor 738 may be used to provide location information to an external location-based service, such as E911 service. The GPS sensor 738 may obtain location information generated via WI-FI, WIMAX, and/or cellular triangulation techniques utilizing one or more of the network connectivity components 706 to aid the GPS sensor 738 in obtaining a location fix. The GPS sensor 738 may also be used in Assisted GPS ("A-GPS") systems.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interface described below, or may include processing functionality built-in to the processor 702.

The display 740 is an output device configured to present information in a visual form. In particular, the display 740 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 740 is a liquid crystal display ("LCD") utilizing any active or passive matrix technology and any backlighting technology (if used). In some configurations, the display 740 is an organic light emitting diode ("OLED") display. Other display types are contemplated.

The touchscreen 742, also referred to herein as a "touch-enabled screen," is an input device configured to detect the presence and location of a touch. The touchscreen 742 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 742 is incorporated on top of the display 740 as a transparent layer to enable a user to use one or more touches to interact with objects or other information presented on the display 740. In other configurations, the touchscreen 742 is a touch pad incorporated on a surface of the computing device that does not include the display 740. For example, the computing device may have a touchscreen incorporated on top of the display 740 and a touch pad on a surface opposite the display 740.

In some configurations, the touchscreen 742 is a single-touch touchscreen. In other configurations, the touchscreen 742 is a multi-touch touchscreen. In some configurations, the touchscreen 742 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 742. As such, a developer may create gestures that are specific to a particular application program.

In some configurations, the touchscreen 742 supports a tap gesture in which a user taps the touchscreen 742 once on an item presented on the display 740. The tap gesture may be used for various reasons including, but not limited to, opening or launching whatever the user taps. In some configurations, the touchscreen 742 supports a double tap gesture in which a user taps the touchscreen 742 twice on an item presented on the display 740. The double tap gesture may be used for various reasons including, but not limited to, zooming in or zooming out in stages. In some configurations, the touchscreen 742 supports a tap and hold gesture in which a user taps the touchscreen 742 and maintains contact for at least a pre-defined time. The tap and hold gesture may be used for various reasons including, but not limited to, opening a context-specific menu.

In some configurations, the touchscreen 742 supports a pan gesture in which a user places a finger on the touchscreen 742 and maintains contact with the touchscreen 742 while moving the finger on the touchscreen 742. The pan gesture may be used for various reasons including, but not limited to, moving through screens, images, or menus at a controlled rate. Multiple finger pan gestures are also contemplated. In some configurations, the touchscreen 742 supports a flick gesture in which a user swipes a finger in the direction the user wants the screen to move. The flick gesture may be used for various reasons including, but not limited to, scrolling horizontally or vertically through menus or pages. In some configurations, the touchscreen 742 supports a pinch and stretch gesture in which a user makes a pinching motion with two fingers (e.g., thumb and forefinger) on the touchscreen 742 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 742. As such, the above gestures should be understood as being illustrative and should not be construed as being limiting in any way.

The data I/O interface component 744 is configured to facilitate input of data to the computing device and output of data from the computing device. In some configurations, the data I/O interface component 744 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 746 is configured to provide audio input and/or output capabilities to the computing device. In some configurations, the audio I/O interface component 746 includes a microphone configured to collect audio signals. In some configurations, the audio I/O interface component 746 includes a headphone jack configured to provide connectivity for headphones or other external speakers. In some configurations, the audio I/O interface component 746 includes a speaker for the output of audio signals. In some configurations, the audio I/O interface component 746 includes an optical audio cable out.

The video I/O interface component 748 is configured to provide video input and/or output capabilities to the computing device. In some configurations, the video I/O interface component 748 includes a video connector configured to receive video as input from another device (e.g., a video media player such as a DVD or BLURAY player) or send video as output to another device (e.g., a monitor, a television, or some other external display). In some configurations, the video I/O interface component 748 includes a High-Definition Multimedia Interface ("HDMI"), mini-HDMI, micro-HDMI, DisplayPort, or proprietary connector to input/output video content. In some configurations, the video I/O interface component 748 or portions thereof is combined with the audio I/O interface component 746 or portions thereof.

The camera 750 can be configured to capture still images and/or video. The camera 750 may utilize a charge coupled device ("CCD") or a complementary metal oxide semiconductor ("CMOS") image sensor to capture images. In some configurations, the camera 750 includes a flash to aid in taking pictures in low-light environments. Settings for the camera 750 may be implemented as hardware or software buttons.

Although not illustrated, one or more hardware buttons may also be included in the computing device architecture 700. The hardware buttons may be used for controlling some operational aspect of the computing device. The hardware buttons may be dedicated buttons or multi-use buttons. The hardware buttons may be mechanical or sensor-based.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The battery gauge 754 can be configured to measure battery parameters such as current, voltage, and temperature. In some configurations, the battery gauge 754 is configured to measure the effect of a battery's discharge rate, temperature, age and other factors to predict remaining life within a certain percentage of error. In some configurations, the battery gauge 754 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 712 may also include a power connector, which may be combined with one or more of the aforementioned I/O components 710. The power components 712 may interface with an external power system or charging equipment via an I/O component.

The disclosure presented herein may be considered in view of the following clauses.

Clause 1: An example including: utilizing a sensor mounted to a tracking device to detect movement of the tracking device; determining if one or more inertial sensors mounted to a moving platform are present; receiving information describing the one or more inertial sensors mounted to the moving platform if it is determined that the one or more inertial sensors mounted to the moving platform are present; determining if the one or more sensors mounted to the moving platform are usable with a sensor mounted to a tracking device; and if it is determined that the one or more sensors mounted to the moving platform are usable with the sensor mounted to the tracking device, utilizing the one or more inertial sensors mounted to the moving platform to determine a frame of reference, and utilizing the sensor mounted to the tracking device to detect movement of the tracking device within the frame of reference.

Clause 2: The example of clause 1, further comprising, utilizing the sensor mounted to the tracking device to detect movement of the tracking device if it is determined that the one or more inertial sensors mounted to the moving platform are not present.

Clause 3: The example of clauses 1-2, wherein determining if the one or more sensors mounted to the moving platform are usable with the sensor mounted to the tracking device is based, at least in part, on data defining a sensitivity of the one or more sensors.

Clause 4: The example of clauses 1-3, wherein determining if the one or more sensors mounted to the moving platform are usable with the sensor mounted to the tracking device is based, at least in part, on data defining at least one tolerance of the one or more sensors.

Clause 5: The example of clauses 1-4, wherein determining if the one or more sensors mounted to the moving platform are usable with the sensor mounted to the tracking device is based, at least in part, on data defining a status of the one or more sensors mounted to the moving platform.

Clause 6: The example of clauses 1-5, wherein determining if one or more inertial sensors mounted to a moving platform are present is based, at least in part, on a signal received from a component in communication with the one or more inertial sensors mounted to the moving platform.

Clause 7: The example of clauses 1-6, wherein determining if one or more inertial sensors mounted to a moving platform are present is based, at least in part, on contextual data describing a location of the tracking device.

Clause 8: The example of clauses 1-7, wherein determining if one or more inertial sensors mounted to a moving platform are present is based, at least in part, on contextual data describing a location of the tracking device relative to at least one component of the moving platform.

Clause 9: A computing device, including a processor; and a computer-readable storage medium in communication with the processor, the computer-readable storage medium having computer-executable instructions stored thereupon which, when executed by the processor, cause the computer to cause processing to determine if one or more inertial sensors mounted to a moving platform are present; receive information describing the one or more inertial sensors mounted to the moving platform if it is determined that the one or more inertial sensors mounted to the moving platform are present; cause processing to determine if the one or more sensors mounted to the moving platform are usable with a sensor mounted to a tracking device; and if it is determined that the one or more sensors mounted to the moving platform are usable with the sensor mounted to the tracking device, utilize the one or more inertial sensors mounted to the moving platform to determine a frame of reference, and utilize the sensor mounted to the tracking device to detect movement of the tracking device within the frame of reference.

Clause 10: The computing device of clause 9, wherein the computer-readable storage medium has further computer-executable instructions stored thereon that cause the computing device to utilize the sensor mounted to the tracking device to detect movement of the tracking device if it is determined that the one or more inertial sensors mounted to the moving platform are not present.

Clause 11: The computing device of clauses 9-10, wherein the computer-readable storage medium has further computer-executable instructions stored thereon that cause the computing device to: if it is determined that the one or more sensors mounted to the moving platform are usable with the sensor mounted to the tracking device, cause a generation of a signal to provide notification; receive an input in response to the notification; if the input indicates an acceptance, utilize the one or more inertial sensors mounted to the moving platform to determine a frame of reference, and utilize the sensor mounted to the tracking device to detect movement of the tracking device within the frame of reference, if the input indicates a rejection, utilize the sensor mounted to the tracking device to detect movement of the tracking device within the frame of reference.

Clause 12: The computing device of clauses 9-11, wherein determining if the one or more sensors mounted to the moving platform are usable with the sensor mounted to the tracking device is based, at least in part, on data defining at least one tolerance of the one or more sensors.

Clause 13: The computing device of clauses 9-12, wherein determining if the one or more sensors mounted to the moving platform are usable with the sensor mounted to the tracking device is based, at least in part, on data defining a status of the one or more sensors mounted to the moving platform.

Clause 14: The computing device of clauses 9-13, wherein determining if one or more inertial sensors mounted to a moving platform are present is based, at least in part, on a signal received from a component in communication with the one or more inertial sensors mounted to the moving platform.

Clause 15: The computing device of clauses 9-14, wherein determining if one or more inertial sensors mounted to a moving platform are present is based, at least in part, on contextual data describing a location of the tracking device.

Clause 16: The computing device of clauses 9-15, wherein determining if one or more inertial sensors mounted to a moving platform are present is based, at least in part, on contextual data describing a location of the tracking device relative to at least one component of the moving platform.

Clause 17: A computer-readable storage medium having computer-executable instructions stored thereupon which, when executed by a computer, cause the computer to: determine if one or more inertial sensors mounted to a moving platform are present; receive information describing the one or more inertial sensors mounted to the moving platform if it is determined that the one or more inertial sensors mounted to the moving platform are present; determine if the one or more sensors mounted to the moving platform are usable with a sensor mounted to a tracking device; and if it is determined that the one or more sensors mounted to the moving platform are usable with the sensor mounted to the tracking device, utilize the one or more inertial sensors mounted to the moving platform to determine a frame of reference, and utilize the sensor mounted to the tracking device to detect movement of the tracking device within the frame of reference.

Clause 18: The computer-readable storage medium of clause 17, wherein determining if the one or more sensors mounted to the moving platform are usable with the sensor mounted to the tracking device is based, at least in part, on data defining a sensitivity of the one or more sensors.

Clause 19: The computer-readable storage medium of clauses 17-18, wherein determining if one or more inertial sensors mounted to a moving platform are present is based, at least in part, on contextual data describing a location of the tracking device.

Clause 20: The computer-readable storage medium of clauses 17-19, wherein determining if one or more inertial sensors mounted to a moving platform are present is based, at least in part, on contextual data describing a location of the tracking device relative to at least one component of the moving platform.

Based on the foregoing, it should be appreciated that concepts and technologies have been disclosed herein that provide enhanced motion tracking using a transportable tracking sensor. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computer-implemented method, the method comprising:
    receiving a first signal from an inertial sensor mounted to a tracking device to detect movement of the tracking device;
    determining that one or more inertial sensors mounted to a moving platform are present;
    receiving information describing an acceleration sensitivity of the one or more inertial sensors mounted to the moving platform, in response to determining that the one or more inertial sensors mounted to the moving platform are present;
    determining, based on the information describing the acceleration sensitivity of the one or more inertial sensors exceeding a threshold level of acceleration sensitivity, that the one or more inertial sensors mounted to the moving platform are usable with the inertial sensor mounted to the tracking device; and
    in response to determining that the acceleration sensitivity exceeds the threshold level of acceleration sensitivity, using the one or more inertial sensors mounted to the moving platform to determine an established frame of reference with the inertial sensor mounted to the tracking device to detect movement of the tracking device within the established frame of reference.

2. The computer-implemented method of claim 1, further comprising, utilizing the inertial sensor mounted to the tracking device to detect movement of the tracking device that it is determined that the one or more inertial sensors mounted to the moving platform are not present.

3. The computer-implemented method of claim 1, wherein determining that the one or more inertial sensors mounted to the moving platform are usable with the inertial sensor mounted to the tracking device is based, at least in part, on the information describing the sensitivity of the one or more inertial sensors meeting or exceeding the threshold.

4. The computer-implemented method of claim 1, wherein determining that the one or more inertial sensors mounted to the moving platform are usable with the inertial sensor mounted to the tracking device is further based, at least in part, on data defining at least one tolerance of the one or more inertial sensors.

5. The computer-implemented method of claim 1, wherein determining that the one or more inertial sensors mounted to the moving platform are usable with the inertial sensor mounted to the tracking device is further based, at least in part, on data defining a status of the one or more inertial sensors mounted to the moving platform.

6. The computer-implemented method of claim 1, wherein determining that one or more inertial sensors mounted to a moving platform are present is further based, at least in part, on a confirmation signal received from a computing device in communication with the one or more inertial sensors mounted to the moving platform.

7. The computer-implemented method of claim 1, wherein determining that the one or more inertial sensors mounted to the moving platform are present is based, at least in part, on contextual data describing a location of the tracking device.

8. The computer-implemented method of claim 1, wherein determining that the one or more inertial sensors mounted to the moving platform are present is based, at least in part, on contextual data describing a location of the tracking device relative to at least one component of the moving platform.

9. A computing device, comprising:
a processor; and
a computer-readable storage medium in communication with the processor, the computer-readable storage medium having computer-executable instructions stored thereupon which, when executed by the processor, cause the computer to
cause processing to determine that one or more inertial sensors mounted to a moving platform are present;
receive information defining an acceleration sensitivity parameter of the one or more inertial sensors mounted to the moving platform in response to determining that the one or more inertial sensors mounted to the moving platform are present;
cause processing to determine, based on the acceleration sensitivity parameter of the one or more inertial sensors meeting or exceeding a threshold level of acceleration sensitivity, that the one or more inertial sensors mounted to the moving platform are usable with a sensor mounted to a tracking device; and
in response to determining that the acceleration sensitivity parameter exceeds the threshold level of acceleration sensitivity,
using the one or more inertial sensors mounted to the moving platform to determine a frame of reference with the sensor mounted to the tracking device to detect movement of the tracking device within the frame of reference.

10. The computing device of claim 9, wherein the computer-readable storage medium has further computer-executable instructions stored thereon that cause the computing device to utilize the sensor mounted to the tracking device to detect movement of the tracking device in response to determining that the one or more inertial sensors mounted to the moving platform are not present.

11. The computing device of claim 9, wherein the computer-readable storage medium has further computer-executable instructions stored thereon that cause the computing device to:
in response to determining that the one or more inertial sensors mounted to the moving platform are usable with the sensor mounted to the tracking device, cause a generation of a signal to provide notification;
receive an input in response to the notification;
when the input indicates an acceptance, utilize the one or more inertial sensors mounted to the moving platform to determine a frame of reference and utilize the sensor mounted to the tracking device to detect movement of the tracking device within the frame of reference, and
when the input indicates a rejection, utilize the sensor mounted to the tracking device to detect movement of the tracking device.

12. The computing device of claim 9, wherein the parameter comprises at least one tolerance of the one or more inertial sensors.

13. The computing device of claim 9, wherein determining if the one or more inertial sensors mounted to the moving platform are usable with the sensor mounted to the tracking device is further based, at least in part, on data defining a status of the one or more inertial sensors mounted to the moving platform.

14. The computing device of claim 9, wherein determining that one or more inertial sensors mounted to a moving platform are present is based, at least in part, on a signal received from a second computing device in communication with the one or more inertial sensors mounted to the moving platform.

15. The computing device of claim 9, wherein determining that one or more inertial sensors mounted to a moving platform are present is based, at least in part, on contextual data describing a location of the tracking device.

16. The computing device of claim 9, wherein determining that one or more inertial sensors mounted to a moving platform are present is based, at least in part, on contextual data describing a location of the tracking device relative to at least one component of the moving platform.

17. A computer-readable storage medium having computer-executable instructions stored thereupon which, when executed by a computer, cause the computer to:
receive information describing an inertial sensitivity parameter of one or more inertial sensors mounted to the moving platform;
determine that the inertial sensitivity parameter of the one or more inertial sensors meets or exceeds a threshold level of acceleration sensitivity; and
in response to determining that the inertial sensitivity parameter of the one or more inertial sensors meets or exceeds the threshold level of acceleration sensitivity, use the one or more inertial sensors mounted to the moving platform to determine a frame of reference with the sensor mounted to the tracking device to detect movement of the tracking device within the frame of reference.

18. The computer-readable storage medium of claim 17, wherein the parameter indicates a sensitivity of the one or more inertial sensors.

19. The computer-readable storage medium of claim 17, wherein the parameter indicates a location of the tracking device, and wherein the threshold is a di stance threshold.

20. The computer-readable storage medium of claim 17, wherein the parameter indicates a location of the tracking device relative to at least one component of the moving platform, and wherein the threshold is a distance threshold.

* * * * *